United States Patent
Hilmer et al.

[11] 3,923,483
[45] Dec. 2, 1975

[54] STEAM SEPARATOR

[75] Inventors: Milton Hilmer, Quakertown; John W. Ritter, Emmaus; Niranjan Jiandani, Allentown, all of Pa.

[73] Assignee: Sarco Company, Allentown, Pa.

[22] Filed: July 23, 1973

[21] Appl. No.: 381,878

[52] U.S. Cl. .................................. 55/463; 239/132
[51] Int. Cl.[2] ......................................... B01D 45/08
[58] Field of Search ............................ 55/462-465, 55/449, 466, 319, 418; 239/132

[56] References Cited
UNITED STATES PATENTS

| | | | |
|---|---|---|---|
| 929,270 | 7/1909 | Ashton | 55/319 |
| 1,442,689 | 1/1923 | Loss | 55/463 |
| 1,813,637 | 7/1931 | Powers | 55/463 |
| 2,336,430 | 12/1943 | Wery | 55/463 |
| 2,859,764 | 11/1958 | Golay | 285/156 |
| 3,006,435 | 10/1961 | Alton et al. | 55/463 |
| 3,386,659 | 6/1968 | Rea | 239/132 |
| 3,724,180 | 4/1973 | Morton et al. | 55/456 |

FOREIGN PATENTS OR APPLICATIONS

| | | | |
|---|---|---|---|
| 434,266 | 9/1926 | Germany | 55/463 |

*Primary Examiner*—Bernard Nozick
*Attorney, Agent, or Firm*—McNenny, Farrington, Pearne & Gordon

[57] ABSTRACT

A steam humidifer including a separator for separating water from wet supply steam and a dry steam distributor. The separator includes a chamber having a conical water separating baffle therein which, according to a preferred aspect of this invention, defines an included angle of 70°. A wet steam inlet conduit changes the direction of the incoming steam 90° and directs it toward the baffle, where water is separated from the steam as it impinges and passes along the conical surface of the baffle. After passing along the baffle, the steam direction is reversed 180° with respect to the incoming steam direction and the dry steam exits the separator through an outlet conduit. Dried steam passes into the atmosphere to be humidified through a ported manifold distributor tube. A portion of that tube is jacketed by a portion of the wet steam inlet conduit to heat the steam in the distributor tube and to thereby maintain its dryness. The outlet tube is provided with a blind branch tube or re-evaporation chamber which terminates in the separator to trap any remaining water associated with the dried steam.

12 Claims, 4 Drawing Figures

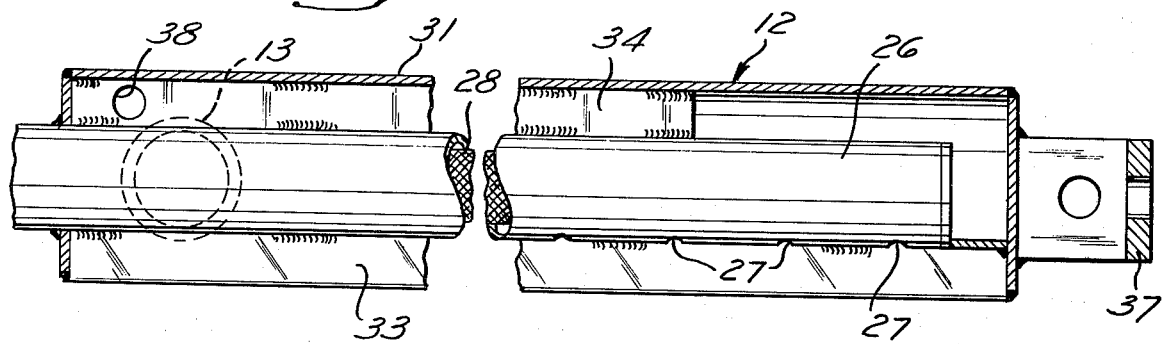
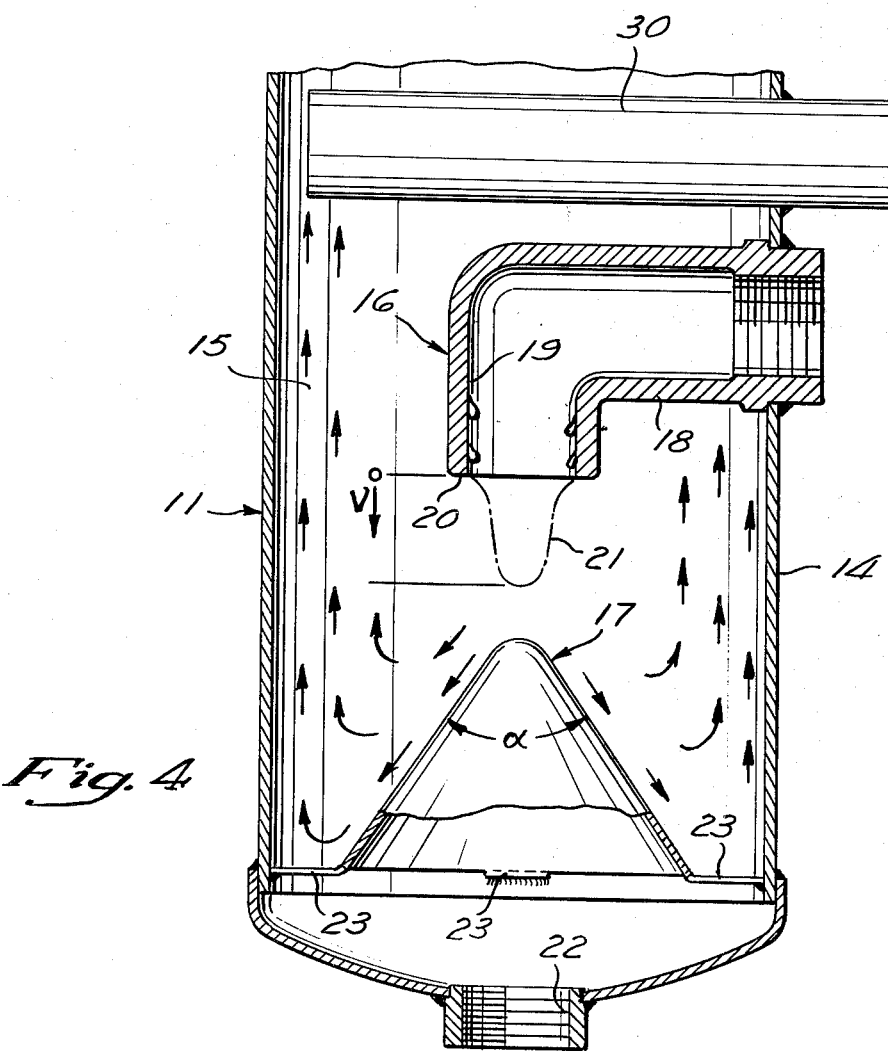

STEAM SEPARATOR

BACKGROUND OF THE INVENTION

This invention relates to humidifiers and, more particularly, to systems employing steam as the humidification agent. Humidification is accomplished by a variety of techniques, namely, by spraying finely atomized water into the atmosphere, by employing evaporative belts that are continuously moistened by water and which are presented to an air flow path, and by direct steam injection. Steam injection is undoubtedly the most efficient humidification system in situations requiring very large quantities of vapor to be discharged and particularly for industrial humidification. Steam injection systems, however, must be properly designed, since humidification by wet steam is accompanied by water droplets emerging from the unit, thus wetting ducts, ceilings, floors, and surrounding equipment.

Steam humidification is usually accomplished by conducting steam through a pipe having perforations therein so that the steam will exit through the perforations and into the atmosphere to be humidified. If wet steam emerges from the perforations, drip pans are provided to collect the water. A more desirable technique is to minimize the emergence of wet steam from the perforations by providing a steam jacket or heated zone surrounding the perforated tube. Such an arrangement is shown in U.S. Pat. Nos. 3,642,201 and 3,486,697. In the latter patent, there is illustrated a hot steam conducting coil surrounding the perforated tube to thereby create a heated zone in the vicinity of the perforations so that saturated steam is dried. U.S. Pat. No. 3,642,201 discloses an arrangement wherein the perforated tube is jacketed so that relatively hot inlet steam heats the perforated outlet tube prior to passing through a steam separator unit. In this arrangement, however, there exists no means to ensure flow of the inlet steam along the perforated dispersing tube, and since condensate will form on the tube when placed in an air stream, there is no assurance that the condensate will be swept away by flowing steam.

It is desirable to dry the steam as completely as possible prior to emergence from the perforated distributor tube. Therefore, separators have been provided in steam humidification systems which are intended to dry the steam by mechanical separating techniques. One such arrangement is shown in the previously described U.S. Pat. No. 3,642,201 and another technique is shown in U.S. Pat. No. 2,314,892. These patents, however, attempt to combine flow control valves in a separating unit, thus complicating the unit and detracting somewhat from the intended separating function thereof.

SUMMARY OF THE INVENTION

This invention provides a steam humidification system which ensures the issuance of dry steam to the space being humidified by a highly efficient steam separator and distributor arrangement. The device includes a chamber having a conical water separating baffle therein which, according to a preferred aspect of this invention, defines an included angle of 70°. A wet steam inlet conduit has a fitting within the housing which changes the direction of the incoming steam 90° and directs it toward the baffle where water is separated from the steam as the steam passes along the conical surface of the baffle. The fitting according to this invention acts as an orifice and as the wet steam enters the separating chamber and assumes a lower pressure, there exists a surplus of sensible heat in the condensate and, therefore, some of the steam condensate may be flashed. Condensate remaining in the steam collects on the conical baffle and flows to a steam trap. The conical design of the baffle ensures that the water will not bounce back to be swept along with the steam flow and also redirects the steam flow so that it does not run countercurrent to the incoming wet steam to thereby collect incoming water particles.

After passing along the baffle, the steam flow path is reversed 180° and flows through an outlet conduit. The outlet conduit includes a perforated distributor tube which is jacketed by a portion of the inlet conduit. A baffle is provided to ensure flow of steam across the entire extent of the distributor tube to sweep away condensate which may form on the distributor tube or on the inner walls of the jacket.

A control valve is provided between the separator and the distributor tube, and a re-evaporation chamber within the separating chamber is connected to the outlet conduit between the valve and the distributor tube. Any droplets of water that may accumulate in the valve are separated and directed back into the re-evaporation chamber to be re-evaporated. This is particularly important where the control valve is closed for a prolonged period of time, permitting steam condensation within the valve body. Such condensate would otherwise be swept into the dispersing tube, with the resultant danger of water's being emitted therefrom.

BRIEF DESCRIPTION OF THE DRAWINGS

FIG. 3 is a cross sectional view, the plane of the section being indicated by the line 3—3 in FIG. 1; and FIG. 4 is a fragmentary cross sectional view of a portion of the separator illustrated in FIG. 1.

DETAILED DESCRIPTION OF THE INVENTION

Figure 1:
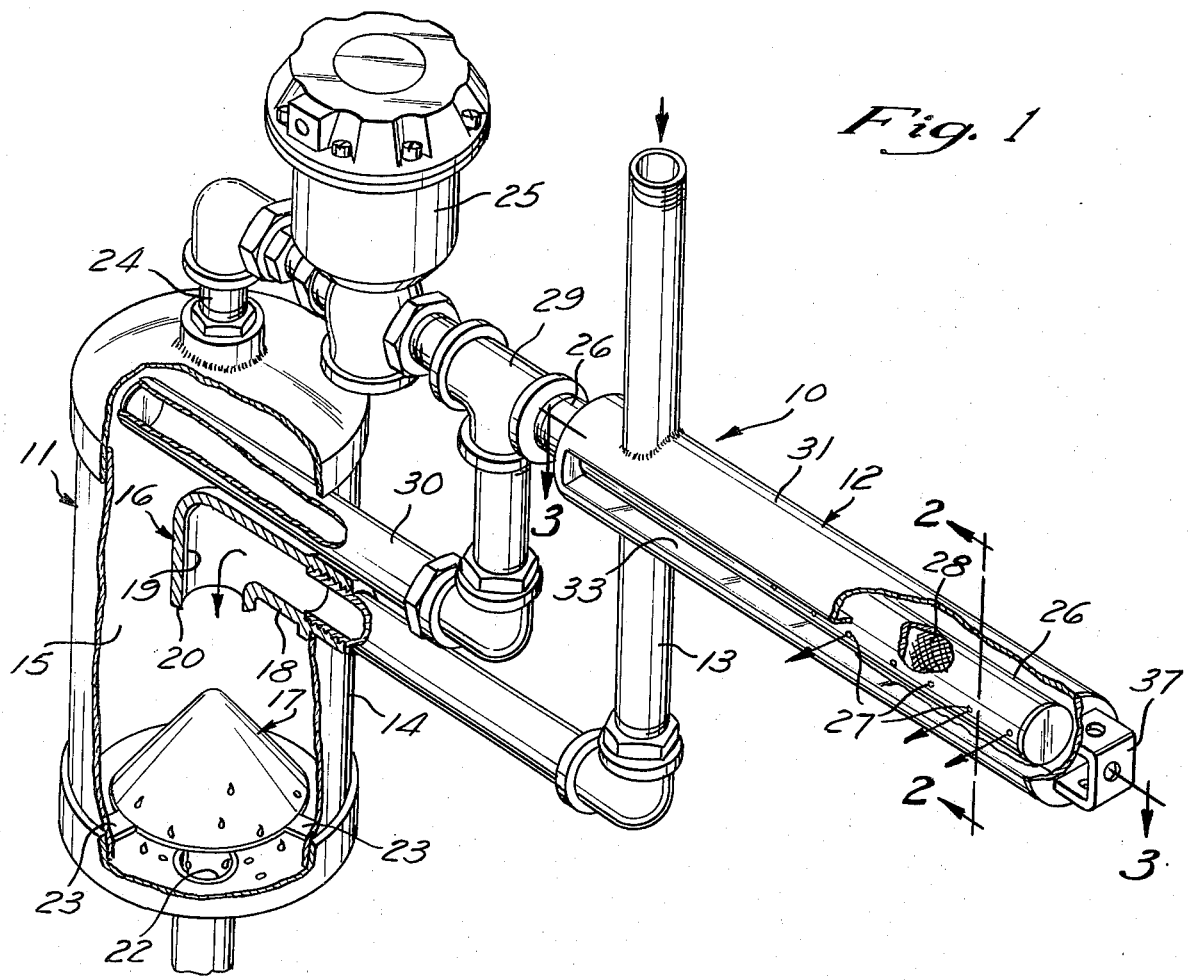
FIG. 1 is a perspective view of a steam humidifier and separator according to this invention, with portions broken away to show details of construction and steam flow paths.

Referring now to the drawing, and particularly to FIG. 1, a steam humidifier and separator unit 10 is illustrated. The unit 10 includes a separator 11 and a steam distributor 12. Wet steam is supplied from a steam generator to the separator 11 by an inlet conduit 13 which projects into a housing 14 defining a separating chamber 15. The inlet conduit 13 is threadedly connected to a diverting fitting 16 which projects into the chamber 15 and which directs the wet steam downwardly in an axial path towards a conical baffle 17.

As may be seen most clearly in FIG. 4, the fitting 16 has a first portion 18 for conducting the wet steam in a first path and has a straight outlet portion having an end wall 19 extending in a second direction and being intersected by the axis of said conduit which extends in said first direction with major portions thereof angularly related to the first direction. Preferably, this angle is 90°, as illustrated in the drawings. It has been found that such an arrangement provides an orifice effect at an outlet end 20 of the fitting 16 having a steam velocity generally indicated by the curve 21. Thus, steam issues from the outlet 20 at a relatively high velocity to the relatively large chamber 15 where the issuing steam is expanded and the velocity is reduced. Impingement of the wet steam on the wall 19 causes some water droplets to form thereon, and those droplets fall downwardly toward the baffle 17. Since the fitting 16 acts as an orifice, there may be some flash in the chamber 15. However, the baffle 17 serves to collect substantially all of the water in the wet steam by impingement of the steam thereon, and water formed on the baffle 17 flows downwardly to an outlet 22 which is connected to a steam trap (not shown).

The baffle 17 is conical and is spaced from the walls of the housing 14 by connecting webs 23 to permit water flow to the outlet 22. It has been found that the baffle 17 should define an included angle $\alpha$ of about 70° for optimum results, although acceptable results are attained if the angle is between 60° and 90°. If the angle substantially exceeds 90° and the cone begins to assume a surface which is normal to the outlet 20, the water droplets will tend to bounce back into the path of steam flow and be entrained therein. If the angle $\alpha$ is substantially less than 60°, no significant baffling effect will obtain. It should be noted that the path of the steam is reversed 180° with respect to inlet flow after passing along the surface of the baffle 17 so that it then flows upwardly within the chamber 15. The flow velocity in that direction is relatively low compared to the incoming steam velocity, to thereby minimize any tendency of the dried steam to pick up incoming moisture. Furthermore, the conical baffle 17 diverts the steam (as indicated by the flow path arrows in FIG. 4) so that its flow path does not run countercurrent to the incoming relatively wet steam.

The dried steam passes out of the separating chamber 15 through an outlet conduit 24 and this outlet flow is regulated by a conventional control valve 25 which is automatically controlled by a conventional humidity-sensitive device (not shown). The dried steam then passes to a distributor tube 26 having outlet ports 27 therethrough. To muffle the noise, a screen 28 is provided within the tube 26.

Between the control valves 25 and the distributor tube 26, there is provided a separating tee 29 which communicates with a hermetically sealed re-evaporation chamber 30 projecting into the chamber 15. Any droplets of water that may accumulate in the cavity of the control valve 25 are separated and directed back into the chamber 30, where they are re-evaporated to flow to the distributor tube 26 through the separating tee 29. The function of the separating tee 29 and the re-evaporation chamber 30 is particularly important in those instances where the valve 25 is closed for a prolonged period of time, since some steam may condense and form water droplets or small reservoirs within the valve body 25. When the control valve 25 opens, this water may be swept into the dispersing tube 26 and exit through the ports 27 if such a re-evaporation chamber is not provided.

Figure 2:
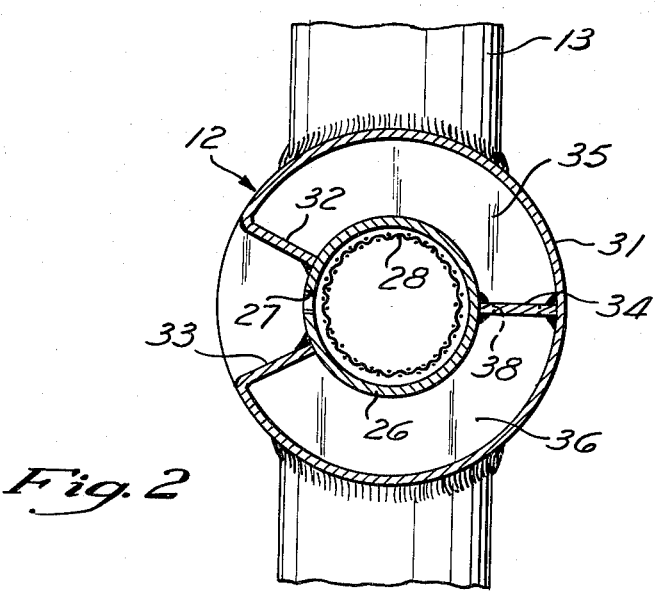
FIG. 2 is a cross sectional view, the plane of the section being indicated by the line 2—2 in FIG. 1.

To further ensure the emergence of dry steam through the ports 27, the inlet conduit 13 has a portion enclosing a portion of the distributor tube 26 so that the distributor tube 26 will be heated by the incoming wet steam. This portion of the inlet conduit comprises a jacket 31 within which the distributor tube 26 is concentrically mounted. The jacket 31 is provided with radially inwardly directed walls 32 and 33 to expose the portion of the distributor tube 26 having the ports 27 therein. An axially extending baffle 34 (FIGS. 2 and 3) extends between the jacket 31 and the distributor tube 26 to provide an upper chamber 35 for the incoming wet steam and a lower chamber 36 for outgoing steam, which is then conducted to the separator 11.

Since the incoming steam is employed to heat the distributor tube 26, and therefore be cooled thereby, some water will condense on the tube 26. This water does not stagnate thereon and, therefore, reduce the thermal conduction to the steam within the distributor tube, since that water is swept along with the incoming steam to the separator 11. As may be seen in FIGS. 1 and 3, the closed end of the distributor tube 26 is spaced from the closed end of the jacket 31 so that condensate will not collect between the wall 32 and the jacket 31.

The distributor 12 is normally oriented in its illustrated horizontal position within a duct (not shown) which serves as a conduit for the moving air to be humidified. The air flow is normally countercurrent to the flow of dry steam from the outlet ports 27. To aid in mounting, a bracket 37 is provided at the end of the distributor 12. In some instances, however, it is desirable or necessary to mount the distributor 12 in a vertical position. In such a position, water would tend to collect at one end of the chamber 35. Therefore, a small opening 38 is provided through the baffle 34 to allow free flow of any accumulated water from the chamber 35 to the chamber 36.

It has been found that the flow rate of steam through the device has very little effect on the efficiency of the separator. The flow can be from zero up to the maximum capacity of the unit, and the quality of the steam emerging is extremely high. For example, if steam with 20% water enters the separator, the quality of the steam from the separator is in the magnitude of 99.7 to 99.8% dryness fraction.

Although a preferred embodiment of this invention is illustrated in detail, it is to be understood that various modifications and rearrangements of parts may be resorted to without departing from the scope of the invention disclosed therein.

What is claimed is:

1. A separator comprising housing means defining a chamber for separating water from wet supply steam, inlet conduit means connected to and in communication with said housing means for conducting wet supply steam to said housing means, said inlet conduit means having an outlet portion within said housing for controlling the inlet steam flow direction within the housing means, outlet conduit means connected to and in communication with said housing means for conducting dry steam from said housing means, separating means within said chamber, said separating means comprising a conical baffle having its axis in substantial alignment with the flow direction of the incoming steam and its apex pointing toward and in substantial axial alignment with said outlet portion, means defining a sealed re-evaporation chamber projecting through a wall of and into said housing means, and means providing fluid communication between said sealed chamber and said outlet conduit means operating to deliver water existing in said outlet conduit to said re-evaporation chamber and to return re-evaporated steam to said outlet conduit.

2. A separator according to claim 1, wherein said inlet conduit means has a portion encasing a portion of said outlet conduit so that said outlet conduit will be heated by the incoming wet steam.

3. A separator according to claim 1, wherein said conical baffle defines an included angle of between about 60° and 90°.

4. A separator according to claim 1, wherein said conical baffle defines an included angle of about 70°.

5. A steam humidifier comprising housing means defining a chamber for separating water from wet supply steam, inlet conduit means for conducting wet supply steam to said housing means, outlet conduit means for conducting dry steam from said housing means, said outlet conduit means comprising an elongated tube closed at one end and having a plurality of outlet apertures along a first portion of said tube, said inlet conduit means having a portion encasing a second portion of said tube so that said tube will be heated by the incoming wet supply steam, baffle means between said tube and said portion of said inlet conduit to direct steam along the length of said tube, separating means within said chamber, said separating means comprising a conical baffle having its axis in substantial alignment with the flow direction of the incoming steam and its apex pointed toward and aligned with said inlet conduit means, means defining a sealed re-evaporation chamber projecting through a wall of and into said housing means, and means providing fluid communication between said sealed chamber and said outlet conduit means operating to deliver water existing in said outlet conduit to said reevaporation chamber and to return re-evaporated steam to said outlet conduit.

6. A steam humidifier according to claim 5, wherein said conical baffle defines an included angle of between about 60° and 90°.

7. A steam humidifier according to claim 5, wherein said conical baffle defines an included angle of about 70°.

8. A steam humidifer according to claim 5, wherein said inlet conduit means has a portion for controlling the inlet steam flow direction within the housing, said portion comprising a conduit extending in a first direction and having a straight outlet portion extending in a second direction, said straight outlet portion having a wall extending to and being intersected by the axis of said conduit which extends in said first direction with major portions thereof angularly related to said first direction to thereby change the direction of said inlet steam to a second direction angularly related to said first direction.

9. A steam humidifer according to claim 8, wherein said major portions of said end wall are angularly related at 90° to said first direction.

10. A steam humidifier according to claim 8, including separating means within said chamber, said separating means comprising a conical baffle having its axis in substantial alignment with said second direction of the incoming steam and in substantial axial alignment with the axis of said semicylindrical end wall.

11. A steam humidifier according to claim 10, wherein said conical baffle defines an included angle of between about 60° and 90°.

12. A steam humidifier according to claim 10, wherein said conical baffle defines an included angle of about 70°.

* * * * *

UNITED STATES PATENT AND TRADEMARK OFFICE
CERTIFICATE OF CORRECTION

PATENT NO. : 3,923,483
DATED : December 2, 1975
INVENTOR(S) : Milton Hilmer, John W. Ritter, & Niranjan Jiandani It is certified that error appears in the above-identified patent and that said Letters Patent are hereby corrected as shown below:

Under the caption "DETAILED DESCRIPTION OF THE INVENTION", Column 2, Line 59, after the words "a first path and has" change the word "a" to -- an --

Under the caption "DETAILED DESCRIPTION OF THE INVENTION", Column 2, Line 59, after you have changed the word "a" to -- an -- as stated above in this Certificate of Correction, following the word "an" delete the word delete the word -- "straight" --

Under the caption "DETAILED DESCRIPTION OF THE INVENTION", Column 2, Line 59, after the words "outlet portion" delete the words -- "having an" and insert the words -- comprising a semicylindrical --

Signed and Sealed this twenty-seventh Day of April 1976

[SEAL]

Attest:

RUTH C. MASON
Attesting Officer

C. MARSHALL DANN
Commissioner of Patents and Trademarks